United States Patent [19]

Schmitt

[11] Patent Number: 5,317,486
[45] Date of Patent: May 31, 1994

[54] HORIZONTAL ZERO VIEWING PORT ASSEMBLY

[75] Inventor: Karl R. Schmitt, Rockford, Ill.

[73] Assignee: Textron Inc., Providence, R.I.

[21] Appl. No.: 37,901

[22] Filed: Mar. 26, 1993

[51] Int. Cl.⁵ .............................................. F21M 3/20
[52] U.S. Cl. ..................................... 362/66; 362/419; 362/428
[58] Field of Search ...................... 362/61, 66, 80, 282, 362/287, 322, 419, 428

[56] References Cited

U.S. PATENT DOCUMENTS

| | | | |
|---|---|---|---|
| 4,916,583 | 4/1990 | Nagasawa . | |
| 5,029,051 | 7/1991 | Shirai et al. | 362/66 |
| 5,031,081 | 7/1991 | Daumueller et al. . | |
| 5,032,964 | 7/1991 | Endo et al. | 362/66 |
| 5,055,980 | 10/1991 | Mochizuki . | |
| 5,067,052 | 11/1991 | Suzuki et al. . | |
| 5,077,642 | 12/1991 | Lisak . | |
| 5,083,244 | 1/1992 | Shirai et al. . | |
| 5,121,303 | 6/1992 | Shirai et al. . | |
| 5,138,542 | 8/1992 | Daumueller et al. | 362/66 |
| 5,140,503 | 8/1992 | Lisak . | |
| 5,150,958 | 9/1992 | Miyazawa et al. | 362/66 |
| 5,151,849 | 9/1992 | Nagengast et al. . | |

*Primary Examiner*—Richard R. Cole
*Attorney, Agent, or Firm*—Trexler, Bushnell, Giangiorgi & Blackstone, Ltd.

[57] ABSTRACT

The present invention envisions a headlamp calibration assembly for use with an adjustable headlamp assembly. The headlamp assembly includes a housing, a reflector adjustably retained in the housing and horizontal and vertical aiming devices. The housing has a viewing port formed therethrough for viewing inside of the housing for observing the movable headlamp component, for example the reflector. The calibration assembly includes an adjustably mounted lens positioned over the viewing port, horizontal position indicia on the reflector positioned for viewing through the lens and viewing port including a zero adjustment indicator represented by a selected one of the horizontal position indicia, and sight means on the lens in the form of indicia or the like for sighting and alignment with the horizontal position indicia to attain zero adjustment as discussed above. The sighting device on the lens includes two pairs of spaced apart parallel lines on either side of the lens to eliminate parallax when viewing the horizontal position indicia. Additionally, the sighting device can be formed on a magnifying prism formed in the lens so that smaller indicia may be used to thereby increase the precision of the horizontal adjustment. The horizontal position indicia may be positionable on or proximate to a vertical position indicating device such as a spirit level. The vertical position indicating device may be positioned for viewing through the lens and viewing port.

23 Claims, 3 Drawing Sheets

HORIZONTAL ZERO VIEWING PORT ASSEMBLY

BACKGROUND INVENTION

The present invention relates to calibration means for use with an adjustable headlamp which is capable of indicating a desired predetermined setting as well as variations from said predetermined setting. The calibration means retain the indication of the settings so that when the headlamp becomes misaligned, the headlamp can be readjusted to the desired predetermined setting.

Headlamp assemblies for vehicles, and more particularly, automobiles, have been studied, engineered, and designed to be less expensive and more aerodynamically efficient. In terms of aerodynamic efficiency, since a headlamp is positioned at the front of a vehicle wind drag on the vehicle can be affected by the shape of the headlamp. As such, headlamps have been aerodynamically designed to reduce the wind drag on the vehicle. Aerodynamic headlamp designs have resulted in sealed headlamp assemblies whereby each headlamp assembly includes a housing which is a sealed unit containing an adjustable reflector and an illuminating device or bulb mounted to the reflector.

Another design change that has been evolving in the automotive industry is the reduction of the overall vehicle size and the more efficient utilization of the space within the vehicle. Space within the engine compartment of the vehicle is utilized under close scrutiny in order to maximize the efficient use of the limited amount of space.

The sealed housing headlamp assemblies extend into the engine compartment. As previously mentioned, the reflector is adjustably retained within the housing of the headlamp assembly. Devices have been developed which are mounted to and extend through the housing and cooperate with the reflector to remotely adjust the horizontal and vertical orientation of the reflector. In this regard, each headlamp assembly typically uses a vertical and horizontal adjusting mechanism to adjust the reflector.

Several U.S. patents are listed below to provide examples of sealed housing headlamp assemblies including vertical and horizontal adjustment devices.

U.S. Pat. No. 5,067,052, Nov. 19, 1991 to Suzuki et al.;
U.S. Pat. No. 5,077,642, Dec. 31, 1991 to Lisak;
U.S. Pat. No. 5,121,303, Jun. 9, 1992 to Shirai et al.;
U.S. Pat. No. 5,140,503, Aug. 18, 1992 to Lisak.

The disclosures of the above patents are incorporated herein by reference and teach devices which include a single pivot point attached between the reflector and the housing. The pivot point provides a fixed reference from which the vertical and horizontal aiming adjustments are made. When a headlamp assembly is manufactured and installed into an automobile, each headlamp is photometrically aimed to comply with standard manufacturing and government specifications. The specifications dictate the horizontal and vertical positioning for a specific type of headlamp used in a specific type of automobile.

An additional problem which arises with sealed headlamp assemblies is the degree of ease and efficiency with which the assembly can be readjusted should it fall out of the specified adjustments. A headlamp may become misaligned as a result of the action of road vibrations on the assembly and adjusting devices or through collisions. Ordinarily, the vehicle would have to be brought to a facility such as a dealership, service station or garage to position the vehicle in front of an appropriate aiming grid to readjust the headlamp assembly to the appropriate specifications.

One solution to this problem was to provide zero adjustment calibration means mounted on the headlamp assembly which are set to indicate the initial specified adjustment. In this regard, these calibration assemblies are fixed to a stationary reference such as the housing and include indicia that indicate the initial desired adjustment position of the headlamp. Since the calibration assembly is adjusted relative to a fixed reference, should the reflector fall out of adjustment, the adjustment devices can be used to bring the indices into alignment thus readjusting the reflector to realign the headlamp. As a result, the vehicle headlamps can be adjusted quickly and easily without having to reaim the headlights against a reference aiming grid.

A variety of calibration assemblies have been developed and several are shown in the patent references cited above. For example, with regard to a vertical adjustment, the devices shown in Lisak '503 and Shirai '303 show a spirit level device attached to the reflector to indicate a desired vertical aiming adjustment. When the reflector is initially vertically adjusted, the spirit level attached thereto is adjusted so that a spirit on the level is centered or indicates a "zero adjustment." Should the reflector fall out of adjustment, the vertical aiming device can be operated to adjust the vertical aim of the reflector so that the spirit will once again read the "zero adjustment."

Calibration means have also been devised for the horizontal adjustment as shown in Shirai '303, Lisak '642, and Suzuki. These patents illustrate a plunger which is used to indicate the initial desired horizontal adjustment. In a similar manner to the vertical calibration assembly, the reflector is horizontally adjusted using photometric means at the factory to attain a desired position. The horizontal calibration assembly is then employed or operated to align certain indicia so that indicia associated with the plunger and a stationary component of the headlamp are aligned to include the "zero position" or desired horizontal orientation. If the reflector moves out of adjustment, the horizontal device will indicate such and the horizontal adjusting device can be used to adjust the reflector so that the horizontal calibration device once again reads the zero adjustment.

With the foregoing background information in mind, the problem has arisen regarding the cost and efficiency of the horizontal and vertical calibration assemblies of the prior art. The vertical and horizontal calibration assemblies discussed hereinabove effectively comprise two independent assemblies positioned generally proximate to the corresponding adjustment device. In other words, the vertical calibration assembly will be positioned near the vertical adjustment device, and the horizontal calibration assembly will be positioned near the horizontal adjustment device.

As previously mentioned, it is desirable to maximize the efficient utilization of space within the engine compartment, and as always to receive overall cost. By having two separate calibration assemblies at two independent locations for each headlamp, special structural and spatial considerations and clear view areas must be provided. As such, it is desirable to consolidate the vertical and horizontal calibration assembly into a single assembly area for each headlamp.

Additionally, it would be desirable to provide more economical calibration assemblies for use with headlamp assemblies. In this regard, the references presented hereinabove, utilized two independent calibration assemblies each having multiple components. The number of components, require that independent research and development for each component as well as manufacturing, part number accounting, and component accounting. Furthermore, the independent calibration assemblies impose structural requirements on the housing such that mountings must be provided for each calibration assembly thereby increasing the complexity of the molds and adding additional elements to the quality control reviews. Therefore, it would be desirable to provide a headlamp calibration assembly which minimizes the number of components used in the assembly to increase the economical efficiency of such an assembly.

OBJECTS AND SUMMARY OF THE INVENTION

A general object of the present invention is to provide a headlamp calibration assembly which simplifies the overall headlamp assembly, while maintaining a high degree of accuracy in the measured adjustment.

An other general object of the present invention is to provide a headlamp calibration assembly for use with a headlamp which consolidates the vertical and horizontal position indicators of the respective calibration assemblies into a single assembly.

Still a further object of the present invention is to provide a headlamp calibration assembly which precisely indicates the adjustment of the reflector within the headlamp housing.

Briefly, and in accordance with the foregoing, the present invention envisions a headlamp calibration assembly for use with an adjustable headlamp assembly. The headlamp assembly includes a housing, a reflector adjustably retained in the housing and horizontal and vertical aiming means. The housing has a viewing port formed therethrough for viewing inside of the housing for observing the movable headlamp component, namely the reflector. The calibration assembly includes an adjustably mounted lens positioned over the viewing port, horizontal position indicia means on the reflector positioned for viewing through the lens and viewing port, including a zero adjustment indicator represented by a selected one of the horizontal position indicia, and sight means on the lens in the form of indicia or the like for sighting and alignment with the horizontal position indicia to attain zero adjustment as discussed above. The sighting device on the lens includes two pairs of spaced apart parallel lines on either side of the lens to eliminate parallax when viewing the horizontal position indicia. Additionally, the sighting device can be formed on a magnifying prism formed in the lens so that smaller indicia may be used to thereby increase the precision of the horizontal adjustment. The horizontal position indicia may be positionable on or proximate to a vertical position indicating device such as a spirit level. The vertical position indicating device may be positioned for viewing through the lens and viewing port. Thus, once the zero position is attained at the factory through photometric means, or the like, the lens is moved or adjusted so that the sight means thereon is aligned with the horizontal position indicia means and more specifically with the zero position indicator of the indicia means.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

While the invention may be susceptible to embodiment in different forms, there is shown in the drawings, and herein will be described in detail, two embodiments of the invention with the understanding that the present description is to be considered an exemplification of the principles of the invention and is not intended to limit the invention to the specific embodiments illustrated and described herein.

Figure 1:
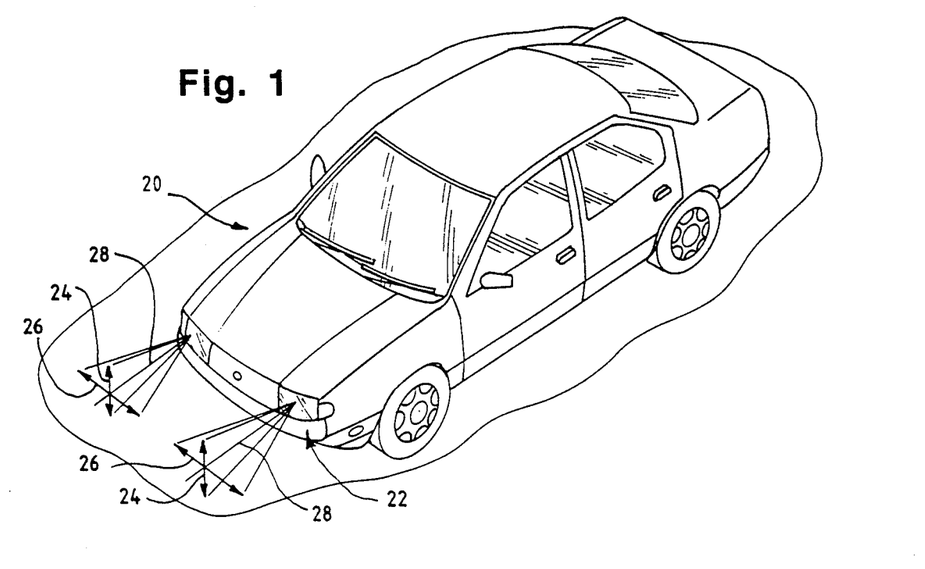
FIG. 1 provides a general view of an automobile indicating a vertical and horizontal adjustment of a headlamp assembly.

Referring now to the drawings wherein like components are referred to with identical reference numerals, FIG. 1 shows a general view of an automobile 20 which uses a headlamp assembly 22 which can be adjusted in a vertical direction (as indicated by arrows 24) as well as adjusted in a horizontal direction (as indicated by arrows 26) relative to a central reference axis 28. FIGS. 2-7 show a first embodiment of the present invention, while FIGS. 8-11 show a second embodiment of the present invention. The two embodiments have the same modes of operation, same function, and same effect, and illustrate two very similar structures for achieving a generally similar operation, function, and effect.

Figures 2, 2A:
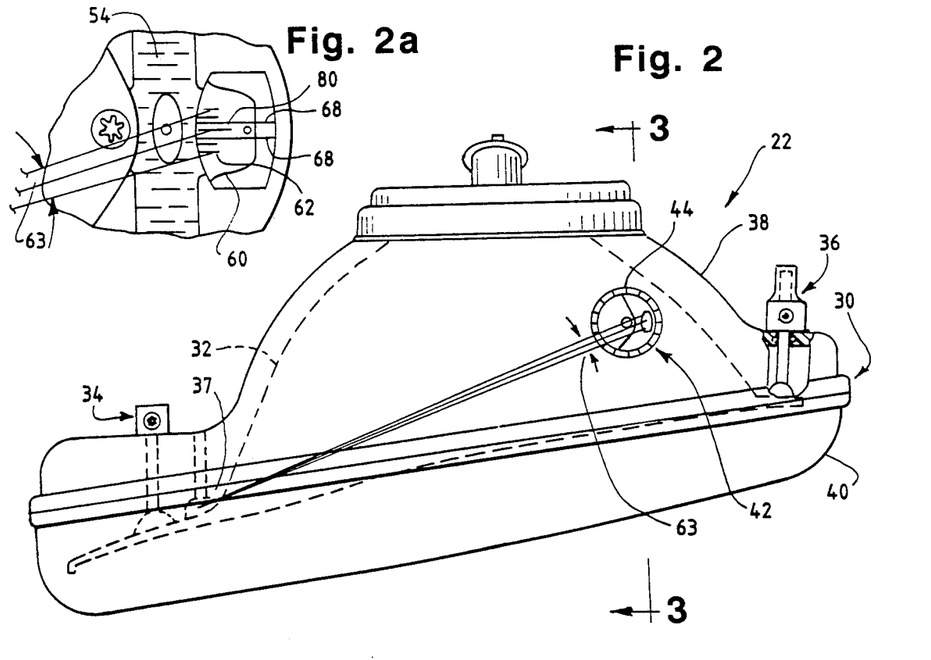
FIG. 2 is a partial fragmentary plan view of a typical headlamp assembly showing vertical and horizontal adjustment devices associated with a movable reflector retained within a housing of the headlamp assembly and a lens of the calibration assembly positioned over a viewing port through the housing.
FIG. 2a is an enlarged, partial fragmentary view of magnified horizontal adjustment indicia as used in the present invention and the corresponding angular relationship as shown in FIG. 2.

Turning now to the first embodiment and FIG. 2, the headlamp assembly 22 as shown in FIG. 1 has been removed from the automobile 20 and is shown in a plan view. The headlamp assembly 22 includes a housing 30 which contains a reflector 32 (shown in FIG. 2 in phantom line, see FIG. 3 for a cross-sectional view of the reflector 32), a vertical adjustment device 34 and a horizontal adjustment device 36. The vertical and horizontal adjustment devices 34,36 adjust the reflector 32 relative to a fixed pivot point 37. The housing 30 includes a main body portion 38 and a front headlamp lens 40. The main body portion 38 is retained within the engine compartment of the automobile 20 while the headlamp lens 40 extends through the engine compartment and is exposed on the outside surface of the automobile 20.

Figures 3, 4, 5, 6, 7:
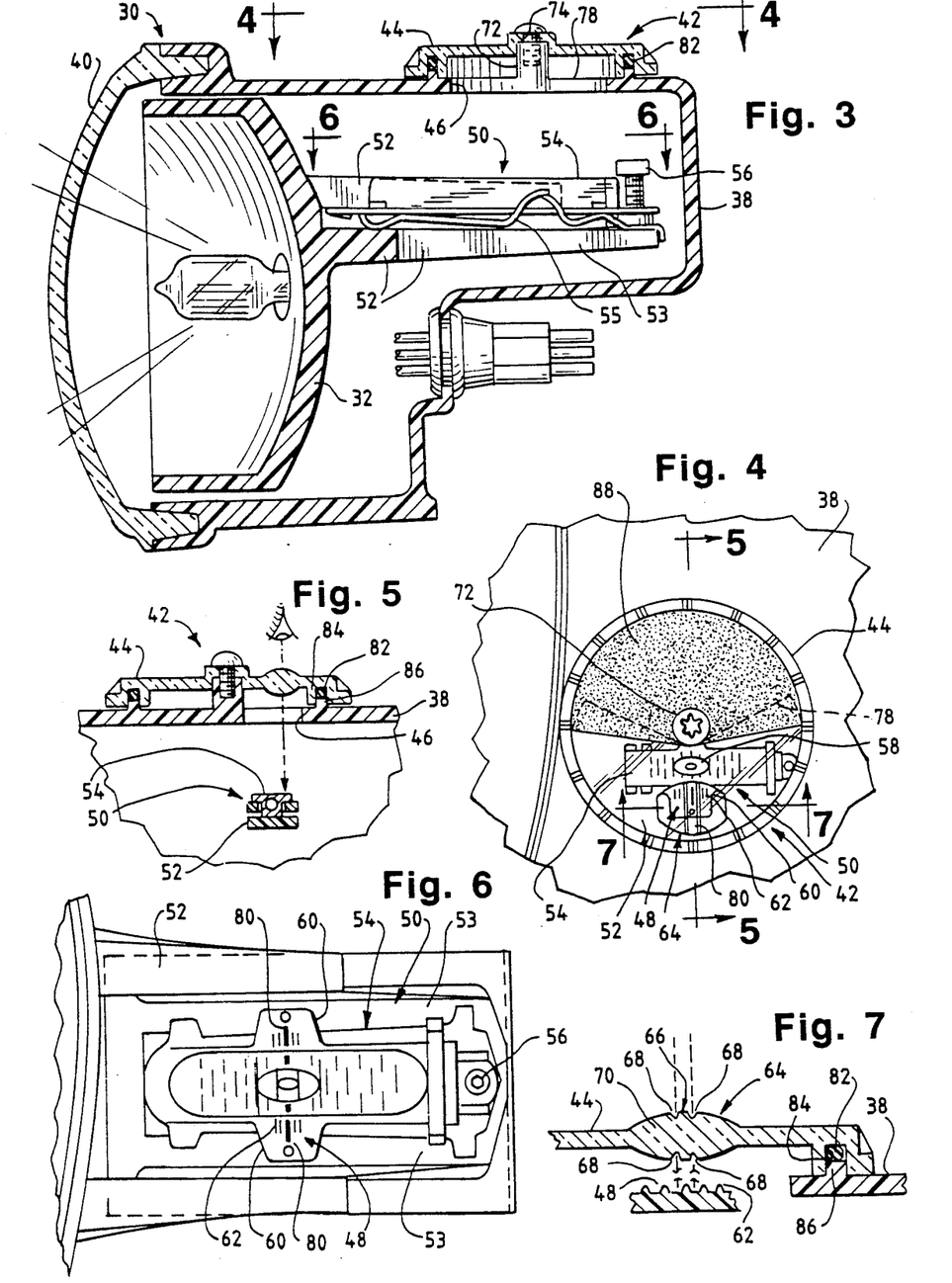
FIG. 3 is a partial fragmentary cross-sectional, side elevational view taken along line 3—3 in FIG. 2.
FIG. 4 is an enlarged plan view taken along line 4—4 in FIG. 3 of a first embodiment of the calibration assembly of the present invention.
FIG. 5 is a simplified, diagrammatic, partial fragmentary, cross-sectional view taken along line 5—5 in FIG. 4 of the lens positioned over the viewing port through the housing and the alignment of a magnifying prism on the lens in relation to a vertical position indicating device.
FIG. 6 is an enlarged plan view taken along line 6—6 in FIG. 3 showing a vertical position indicating device in the form of a spirit level including depending wings with indicia thereon for use in indicating a horizontal position of the reflector.
FIG. 7 is an enlarged partial fragmentary, cross-sectional view through the magnifying taken along line 7—7 in FIG. 4 showing the relationship of the sight means on the magnifying prism and the indicia on the depending wings extending from the vertical position indicating device.

FIGS. 3 and 5 show a headlamp calibration assembly 42 in accordance with the present invention for use with the headlamp assembly to provide both horizontal and vertical indications of the relative zero positions. The headlamp calibration assembly 42 includes a movable lens 44, which in the illustrated preferred embodiment is rotatably disposed over a viewing port 46 formed through the housing 30, and horizontal position indicating means 48 depending from the reflector (as better shown in FIGS. 4,6, and 7). As shown in FIGS. 3-6, vertical position indicating means 50 are also included in the form of a spirit level 54 and said means depends from the reflector 32. The horizontal and vertical position indicating means 48,50 are associated with the reflector 32 and ar both positioned for viewing through the lens 44 and viewing port 46.

The vertical position indicating means 50 includes a bracket 52 extending from the reflector 32 and a liquid level indicating device 54 mounted upon the bracket 52. The liquid level indicating device 54 is shown in the present invention as a "spirit level" device. The spirit level 54 is adjustably mounted to the bracket 52, with adjustment being attained by means of an adjustable fastener 56. The mounting of the indicating device 54 to the bracket 52, which is slotted, is provided by spring clip means 55 in a known manner. After initially adjusting the vertical position of the reflector 32 at the factory, the vertical position indicating means 50 is calibrated by way of the adjustment fastener 56 which is operated to move the spirit level 54 without movement of the reflector to set or attain a vertical zero adjust position 58 as shown in FIGS. 2a, 4, and 6.

The vertical indicating means 50 is essentially standard in the art. The present invention, however, contemplates incorporating the horizontal indicating means 48 in the same general overall assembly, as will become apparently. More specifically, as shown in FIGS. 2-7 the horizontal position indicating means 48 includes protrusions or wing-like structures 60 which extend from the sides of the spirit level 54 generally in the vicinity of the vertical zero adjust position 58. Indicia 62 are applied to the protrusions 60 to provide precise adjustment indications with respect to the horizontal aiming of the headlamp assembly 22. With further reference to FIGS. 2 and 2a, the indicia 62 correspond to horizontal adjustment angular dimensions (as shown generally by angle 63) relative to the fixed pivot point 37. As shown in FIG. 2a, the angular dimension 63 translates into generally linear dimensions as measured by the indicia 62 on the protrusions 60. The spacing between the individual marks of the indicia 62 represent an angle, measured from the pivot point 37, of approximately 0.38°. Other angular measurements may be provided on the indicia as required for a particular device.

The indicia 62 can either be molded directly into the top surface of the protrusions 60 or attached by means of decal placed on the top surface. Molding of the indicia directly onto the top surface of the protrusions 60 eliminates another part. As shown in FIG. 6, the protrusions 60 are formed on either side of the spirit level 54 such that the same spirit level can be used for either left side or right side headlamp assemblies. As a further alternative, the indicia may be applied to the arms 53 of the bracket 52 which define the slots into which the mounting spring members 55 are disposed.

It should be noted that the invention as disclosed herein is fully compatible with either left side or right side headlamp assemblies. The interchangeability of the calibration assemblies improves the efficiency and economic advantage of the present invention.

The lens 44 crosses the receiving port 46 and overlies the spirit level 54 and indicia 62 and is formed of an amorphous nylon material, which is resistant to the high temperatures which are experienced in the engine compartment of an automobile and is also resistant to chemicals found in this environment. Such an amorphous nylon includes a product known as ZYTEL TM which is produced by DuPont Corporation. The lens 44 referably includes a magnifier portion or magnifying prism 64 molded directly into the surface lens 44. The magnifying prism 64 magnifies the indicia 62 (as in FIG. 2a) to increase the precision of the horizontal aiming adjustment.

With reference to FIG. 7, the magnifying prism 64 is formed with a sight 66 formed directly thereon. The sight 66 as shown in FIG. 7 includes two pair of spaced apart sighting lines 68 formed on each side of the magnifying prism 64. Each line and each pair of sighting lines 68 is positioned directly opposite the corresponding line 68 and pair on the opposite side of the prism 64. The parallel orientation of the sighting lines 68 requires a user to view the indicia 62 positioned below the prism 64 directly through a central viewing area 70 of the prism 64. If the user tries to view the indicia 62 other than through the central viewing area 70, the diagonally opposite lines of each parallel lines will obstruct the user's view. This sighting line 68 arrangement essentially eliminates parallax when viewing the indicia 62. As such, greater precision is achieved when viewing the indicia 62 through the prism 64 using the sight 66.

While double sight lines 68 have been shown and discussed, it should be understood that the sighting function may also be achieved by using a single sight line 68 or other sighting marker on the lens 44.

As shown in FIGS. 4 and 5, the lens 44 is attached to the housing 30 for relative movement by means of a single lens fastener 72. The lens fastener 72 extends through a fastener bore 74 formed through the lens 44 and engages a boss 76 formed on a web portion 78 extending from the housing 30 into the viewing port 46. The central position of the fastener 72 allows the lens 44 to be rotated about the fastener 72 when the fastener 7 is slightly loosened from engagement in the boss 76 thereby allowing rotation of the lens 44 over the viewing port 46. Rotation of the lens 44 allows proper precise alignment of the sight 66 over a zero adjust mark 80 of the indicia 62. While the invention is illustrated with a lens 44 that is relatively movable by means of rotation, it is conceivable that a linearly movable lens could be employed. The primary requirements are that the lens can be moved to align the sight 66 with the zero adjust mark 80, and that the lens prevent moisture and dirt from passing into the housing 30.

Once the vertical adjustment and calibration have been set as discussed above, and the horizontal aiming adjustment has been made, the lens 44 is mounted and rotated to a position where the horizontal zero adjustment mark 80 on the corresponding protrusion 60 is aligned between the sight lines 68 of the sight 66. Once the sight 66 is aligned with the zero adjust 80, the fastener 72 is secured to retain the desired horizontal aiming calibration. Thereafter, any misalignment of the headlamp in either the vertical or horizontal will be readily indicated by the overall assembly 42. More specifically, spirit level 54 will indicate vertical misalignment, while the alignment of sight lines 68 with indicia 62 will indicate horizontal misalignment. When either or both occurs, the adjustment means 34 and 36 may be operated to move the indicator back to the "zero" positions, thus attaining proper alignment.

In order to further secure the selected position of the lens 44, and to seal the housing 30 to prevent moisture and debris from entering through the view port 46, a gasket 82 is provided between the lens 44 and the housing 30. The gasket 82 is retained between an annular groove 84 and an annular protrusion 86. As shown in FIGS. 3 and 6, the annular groove 84 is formed in the lens 44 and the protrusion 86 is formed on the housing 30.

While the lens 44 has an optical finish, the magnifying prism 64 must have a high quality magnifying optical finish. By focusing the sight 66 between the sight lines 68 of the prism 64 the quality of the surrounding area must be acceptable but need not provide special optical characteristics. As an additional matter, a non-viewing area 88 of the lens 44 may be formed with a translucent finish to further reduce optical distractions thereby increasing precision of the reading through the magnifying prism 64.

A second embodiment of the present invention is illustrated in FIGS. 8-11 utilizing the same inventive principles set forth in the first embodiment as shown in FIGS. 2-7. Features in the second embodiment which are the same as those shown in the first embodiment are represented by the same reference numerals with the addition of an alphabetic suffix, for example: "reflector 32a".

Figures 8, 9, 10, 11:
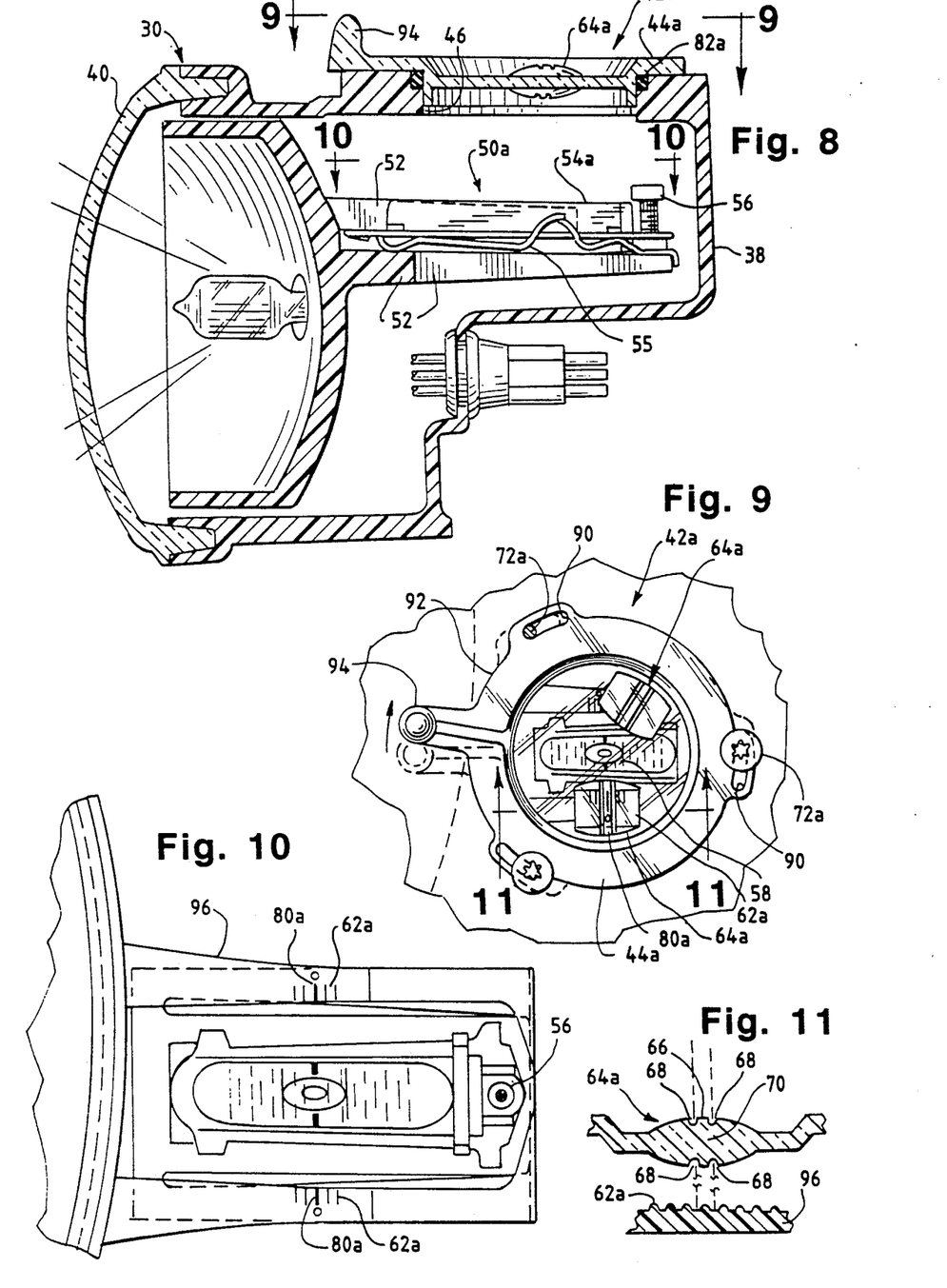
FIG. 8 is a simplified, diagrammatic, cross-sectional side elevational view of a second embodiment of the present invention.
FIG. 9 is a plan view of the second embodiment taken along line 9—9 in FIG. 8.
FIG. 10 is an enlarged plan view of the vertical position indicating device as shown in FIG. 8 including indicia placed on a mounting bracket used to support the vertical position indicating device.
FIG. 11 is a partial fragmentary cross-sectional view taken along 11—11 in FIG. 9 showing the relationship between the sight means on the magnifying prism and the indicia of the second embodiment.

The lens 44a is secured over the viewing port 46 by means of three generally equidistantally spaced fasteners 72a which extend through circumferencially elongated bores 90 formed along the perimeter 92 of the lens 44a. The bores 90 allow the lens 44a to be rotated over the circumferential length of the bore 90 to provide precision adjustment of the magnifying prism 64a relative to the indicia 62. The handle 94 facilitates the rotary adjustment of the lens 44a.

As shown in FIG. 10, the indicia 62a is attached to a top surface of a prong 96 of the bracket 52a.

In use, the present invention helps provide retained adjustment markings to indicate the proper vertical and horizontal adjustments of the reflector 32 in a headlamp assembly 22. The headlamp calibration assembly 42 includes the lens 44 rotatably adjustably retained on the housing 30, and horizontal position indicating means 48 in the form of indicia 62 positioned relative to the reflector 32.

When the headlamp assembly 22 is initially installed in an automobile 20 at the factory, the headlamp 22 is photometrically, vertically and horizontally adjusted so that the beam projecting from the headlamp is properly adjusted within standard and manufacturing and/or government specifications. Once the adjustment is made, the vertical position indicating means 48 is adjusted to record the desired, calibrated adjustment as a zero position or adjustment 58. In the case of the illustrated embodiments, the spirit level 54 is adjusted so that the bubble is set on the zero adjustment 58.

Having adjusted the vertical position and adjusted the vertical indicating means 50, the lens 44 is installed and the horizontal position indicating means 48 is adjusted. The horizontal position indicating means 48 includes the indicia 62 and the sight 66 formed on the lens 44. The lens 44 is rotated so that the sight 66 aligns over the zero adjustment 80 of the indicia 62. With the lens 44 thus adjusted, the fastener 72 is secured to retain the lens 44 in the desired position.

At some time during the use of the car in which the headlamp is mounted the reflector 32 of the headlamp assembly 22 may fall out of adjustment. When the reflector is misaligned, a service person can view both the vertical and horizontal position indicating means 50,48 through the lens 44 and the viewing port 46. If either the vertical zero adjust 58 or the horizontal zero adjust 80 is out of alignment, the vertical and horizontal adjusting means 34, 36 can be adjusted to bring the zero adjustments 58, 80 back into adjustment.

As the vertical and horizontal adjustment devices 34, 36 are adjusted, the reflector 32 moves thereby moving the spirit level 54 and the indicia 62. Since the lens 44 is fixed to the housing 30, the position of the sight 66 on the lens 44 will not become misaligned. As such, once the vertical adjustment is corrected and the bubble is at the zero adjustment 58, the horizontal adjustment device 36 can be operated to position the zero adjust 80 of the indicia 62 in alignment with the sight 66.

While a preferred embodiment of the present invention is shown and described, it is envisioned that those skilled in the art may devise various modifications of the present invention without departing from the spirit and scope of the appended claims. The invention is not intended to be limited by the foregoing disclosure and illustrated embodiments.

The invention claimed is:

1. A headlamp calibration assembly for use with an adjustable headlamp assembly having a housing, a relatively movable component such as a reflector adjustably retained in said housing, means for horizontally aiming said relatively movable component, and a viewing port in a surface of said housing for viewing inside said housing, said headlamp calibration assembly comprising: a relatively movable lens disposed over said viewing port; horizontal position indicating mean in the form of indicia operatively associated with said relatively movable component and positioned for viewing through said lens and viewing port; and sight means operatively associated with said lens for sighting said indicia, such that once the desired horizontal position for the relatively movable component is attained said lens may be moved to align said sight means with said indicia to provide a reproducible indication of said desired position.

2. A headlamp calibration assembly as recited in claim 1, wherein said horizontal position indicating means includes an arm extending from said reflector, said arm having said indicia disposed thereon, horizontal movement of said reflector producing a corresponding movement of said indicia relative to said sight.

3. A headlamp calibration assembly as recited in claim 1, further comprising magnifying means formed on said lens for magnifying said indicia, said sight means being formed on said magnifying means.

4. A headlamp calibration assembly as recited in claim 1, wherein said lens is rotatably disposed over said viewing port.

5. A headlamp calibration assembly as recited in claim 4, further comprising one fastener extending through a central area of said lens, said fastener extending through said lens and engaging said housing of said headlamp assembly, said lens being rotatable about said fastener, said fastener releasable fastening said lens to said housing in a desired position.

6. A headlamp calibration assembly as recited in claim 4, further comprising at least two fasteners extending through said lens at radially spaced apart locations from a point of said lens, said fasteners extending through said lens and engaging said housing of said headlamp assembly, said lens being rotatably retained on said housing by said at least two fasteners.

7. A headlamp calibration assembly as recited in claim 6, wherein said lens includes three fastener bores formed therethrough at radially spaced apart locations from a point on said lens, each of said fastener bores being sized for receiving a fastener for attaching said lens to said housing, said fastener bores being elongated about said lens circumference for allowing rotary movement of said lens relative to said viewing port for aligning said sight with said indicia.

8. A headlamp calibration assembly as recited in claim 1, wherein said lens includes a generally planar lens, said sight being formed on said lens and further comprising two pair of spaced apart sighting lines, one pair of sighting lines being formed on each side of said lens, for minimizing parallax when viewing said indicia.

9. A headlamp calibration assembly as recited in claim 1, further comprising gasket means being retainably positioned between said lens and said housing for preventing moisture and debris from entering said housing through said viewing port.

10. A headlamp calibration assembly as recited in claim 1, further comprising vertical position indicating means depending from said relatively movable component and positioned for viewing through said lens and viewing port.

11. A headlamp calibration assembly as recited in claim 10, wherein said indicia of said horizontal position indicating means are mounted upon said vertical position indicating means.

12. An adjustable headlamp assembly having a housing, an adjustable component such as a reflector retained in said housing, means for horizontally aiming said component, means for vertically aiming said component, a viewing port in a surface of said housing for viewing inside said housing, and a headlamp calibration assembly; said headlamp calibration assembly comprising:

a lens covering said viewing port and being movably attached to said housing;

vertical position indicating means disposed inside said housing and being operatively associated with said component, said vertical position indicating means being visible through said lens and viewing port for indicating a relative vertical position of said component;

horizontal position indicia disposed inside said housing and being operatively associated with said component, said horizontal position indicia being viewable through said lens and said viewing port for indicating a relative horizontal position of said component;

a zero adjustment indicia represented on said horizontal position indicia for indicating a desired horizontal adjustment of said headlamp; and sight means operatively associated with said lens for sighting said horizontal position indicia to determine whether adjustment of said horizontal and vertical adjustment means is required and to sight said horizontal position indicia to said zero adjustment when adjustment is required.

13. A headlamp calibration assembly as recited in claim 12, said sight means further comprising two pair of spaced apart sighting lines, one pair of sighting lines being formed on each side of said magnifier, for eliminating parallax when viewing said horizontal position indicia through said magnifier.

14. A headlamp calibration assembly as recited in claim 12, said lens further comprising a magnifier for magnifying said horizontal position indicia.

15. An adjustable headlamp assembly having a housing, an adjustable component such as a reflector adjustably retained in said housing, means for horizontally aiming said adjustable component, means for vertically aiming said adjustable component, a viewing port in a surface of said housing for viewing inside said housing, and a headlamp calibration assembly; said headlamp calibration assembly comprising:

a lens covering said viewing port, said lens being movably attached to said housing;

vertical position indicating means disposed inside said housing and operatively associated with said adjustable component, said vertical position indicating means being visible through said lens and viewing port for indicating a vertical position of said adjustable component;

horizontal position indicia depending from said adjustable component, said horizontal position indicia being viewable through said lens and said viewing port for indicating a horizontal position of said adjustable component;

a zero adjustment element on said horizontal position indicia for indicating a desired horizontal adjustment of said headlamp;

a magnifier portion associated with said lens for magnifying said horizontal position indicia; and sight means operatively associated with said magnifier portion for sighting said horizontal position indicia to determine whether said headlamp is in a desired horizontal adjustment and to sight said zero adjustment element of horizontal position indicia when adjusting said horizontal adjustment means.

16. A headlamp calibration assembly as recited in claim 15, said sight means comprising two pair of spaced apart sighting lines, one pair of sighting lines being formed on each side of said magnifier portion, for eliminating parallax when viewing said indicia through said magnifier portion.

17. A headlamp calibration assembly for use with an adjustable headlamp assembly having a housing, an adjustable component such as a reflector operatively associated with said housing, means for horizontally aiming said adjustable component, and a viewing port in a surface of said housing for viewing inside said housing, said headlamp calibration assembly comprising: a lens operatively associated with said viewing port; horizontal position indicia operatively associated with said adjustable component and positioned for viewing through said lens and viewing port; a zero adjustment represented on said horizontal position indicia for indicating a desired horizontal adjustment of said headlamp; sight means operatively associated with said lens for sighting said horizontal position indicia to determine whether adjustment of said horizontal and vertical adjustment means is required and to sight said horizontal position indicia to said zero adjustment when adjustment is required.

18. A headlamp calibration assembly as recited in claim 17, wherein said lens is generally planar, said sight being formed on said lens and further comprising two pair of spaced apart sighting lines, one pair of sighting lines being formed on each side of said lens, for eliminating parallax when viewing said indicia.

19. A headlamp calibration assembly as recited in claim 18, said lens further comprising a magnifier portion for magnifying said horizontal position indicia, said sighting lines being formed on each side of said magnifier portion.

20. A method of indicating a relative vertical and horizontal position and calibrating an adjustable headlamp assembly for a vehicle, said adjustable headlamp assembly including a housing, an adjustable component such as a reflector operatively associated with said housing, a viewing port in a surface of said housing for viewing inside said housing, vertical position indicating means operatively associated with said adjustable component, a lens operatively associated said viewing port, horizontal position indicia operatively associated with said adjustable component and positioned for viewing through said lens and viewing port, and sight means disposed on said lens; said method comprising the steps of: selecting a desired vertical and horizontal position of said adjustable component; calibrating said vertical position indicating means to specifically identify the desired vertical position; positioning said lens to align said sight means with a selected portion of said horizontal position indicia to specifically identify the desired horizontal position.

21. A headlamp calibration arrangement for use in adjusting an automobile headlamp in both the vertical and horizontal orientations, wherein said headlamp includes a housing, a relatively movable component within the housing, such as a reflector, and means for adjusting the horizontal and vertical position of said relatively movable component, said calibration arrangement including a viewing port in said housing, vertical position indicating means viewable through said port, a relatively movable lens associated with said viewing port and including sight means providing first horizontal position indicia and horizontal position indicating means associated with said relatively movable component providing second horizontal position indicia, such that once the desired horizontal position of the relatively movable component is established said lens may be moved to align said sight means and said first horizontal positioning indicia with a selected one of second horizontal position indicia to define and indicate zero horizontal position.

22. A headlamp calibration assembly as recited in claim 21, said lens further comprising magnifying means for magnifying said indicia, said sight means being formed on said magnifying means.

23. A headlamp calibration assembly as recited in claim 21, wherein said lens includes a generally planar lens, said sight being formed on said lens and further comprising two pair of spaced apart sighting lines, one pair of sighting lines being formed on each side of said lens, for minimizing parallax when viewing said indicia.

* * * * *

UNITED STATES PATENT AND TRADEMARK OFFICE
CERTIFICATE OF CORRECTION

PATENT NO. : 5,317,486
DATED : May 31, 1994
INVENTOR(S) : Karl R. Schmitt

It is certified that error appears in the above-indentified patent and that said Letters Patent is hereby corrected as shown below:

Column 5, Line 46 "ar" should be — are —

Column 7, Line 8 " 7 " should be — 72 —

Column 9, Line 2 " mean " should be — means —

Signed and Sealed this

Twentieth Day of September, 1994

Attest:

BRUCE LEHMAN

*Attesting Officer*   *Commissioner of Patents and Trademarks*